United States Patent [19]

Zurawski

[11] 4,117,276
[45] Sep. 26, 1978

[54] HANDSET LOCKING AND RELEASE MECHANISM

[75] Inventor: Ronald Anthony Zurawski, Rolling Meadows, Ill.

[73] Assignee: Motorola, Inc., Schaumburg, Ill.

[21] Appl. No.: 799,852

[22] Filed: May 23, 1977

[51] Int. Cl.² .............................................. H04M 1/06
[52] U.S. Cl. .................................. 179/161; 179/100 C
[58] Field of Search ............... 179/161, 100 R, 100 C, 179/146 R

[56] References Cited

U.S. PATENT DOCUMENTS

| 2,782,261 | 2/1957 | Henrikson et al. | 179/100 R |
| 3,889,071 | 6/1975 | Davis et al. | 179/100 R |
| 3,941,951 | 2/1976 | Engstrom et al. | 179/100 C X |

*Primary Examiner*—William C. Cooper

*Attorney, Agent, or Firm*—James W. Gillman; Sang Ki Lee

[57] ABSTRACT

A telephone apparatus includes a handset with a heel and a head with a recess, a base having a first depressed part with a lip to receive and hold the heel of the handset and a second depressed part adapted to receive the head of the handset when the handset is placed on the base, a locking arm with a boss, the arm being pivotally mounted on the base and the boss being located on the arm at a distance from the pivot thereof and being positioned to mate with the recess of the head of the handset and a spring loaded lever mechanism pivotally mounted on the base for keeping the locking arm in a locking position whereby its boss is kept mated in the recess of the second part of the base. The lever mechanism is also adopted to move the locking arm to withdraw the boss away from the recess to a released position in response to an external pressure applied thereto to release the handset.

4 Claims, 4 Drawing Figures

U.S. Patent    Sept. 26, 1978    4,117,276 ature of the  HANDSET LOCKING AND RELEASE MECHANISM

FIELD OF THE INVENTION

This invention generally relates to an apparatus such as a telephone that has a handset and a base member and, in particular, relates to an improved locking and release mechanism of a mobile radio telephone.

BACKGROUND OF THE INVENTION

Certain types of apparatus, such as a mobile radio telephone apparatus, used in a mobile vehicle, such as an automobile, is subject to a high level of vibration. Thus, unlike stationary telephone receivers wherein the handset is essentially designed to rest on a base station by the force of gravity, the handset of a telephone apparatus in a mobile vehicle must be coupled to the base securely so that the handset stays in its position as the vehicle moves and vibrates the handset.

In the past, significant effort has been directed to designing a mechanism for releasably securing the handset to the base. Typically, such a mechanism includes a lever mechanism for permitting the operator to position the handset onto the base and a latch mechanism to hold the handset on to the base. The prior art apparatus includes manually operable release mechanism for releasing the latch mechanism for releasing the handset.

Notwithstanding the substantial resources that have been committed to developing suitable latching and releasing mechanisms, none has been found very satisfactory. They tend to be either very complex or simple but not very reliable when subjected to a high degree of vibrating environment. They also tend to be rather difficult to operate in a mobile environment when the apparatus is used in a mobile vehicle where the driver of the automobile must at the same time pay attention to the driving of the automobile.

SUMMARY OF THE INVENTION

It is an object of the present invention to provide an improved apparatus of the type that includes a handset and a base and means for positioning and securing the handset on to the base in a mobile environment and lifting the handset off from the base easily.

It is still another object of the invention to increase the reliability of the latching and releasing mechanism in a mobile radio telephone apparatus.

The aforementioned and other objects of the present invention is obtained by an apparatus that includes a handset, a base, a locking arm, and a spring loaded lever mechanism, all operatively designed to permit the operator to release the handset from the base in a single unitary motion as the operator uses his fingers to grab the handset and at the same time can conveniently and readily apply a force to release the latching mechanism.

According to an aspect of the present invention, the apparatus is provided with a handset with a heel and a head with a recess, a base having a first depressed part shaped to receive and hold the heel of the handset and a second depressed part to receive the head of the handset when the handset is placed on the base, a locking arm with a boss, the arm being pivotally mounted on the base and the boss being located on the arm and positioned to mate with the recess in the head of the handset and a spring loaded lever mechanism pivotally mounted on the base for keeping the locking arm in the lock position to keep its boss mated in the recess of the handset. The spring loaded lever mechanism is further adopted to be operable to move the boss away from the recess to a release position when an external pressure is applied to the lever mechanism to move the locking arm about its pivot to withdraw the boss from the recess in the head so that the handset is released. The foregoing and other objects of the present invention will be more clearly understood from a detailed description of an illustrative embodiment of the present invention in conjunction with the accompanying drawings.

DETAILED DESCRIPTION

Figure 1:
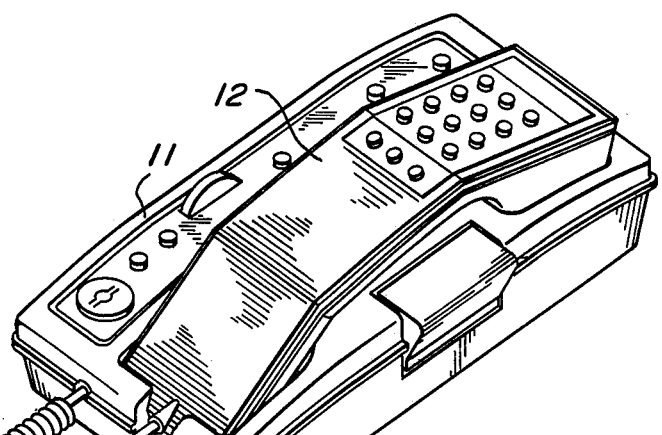
FIG. 1 shows a perspective view of a mobile radio handset and base embodying the present invention.
Figure 2:
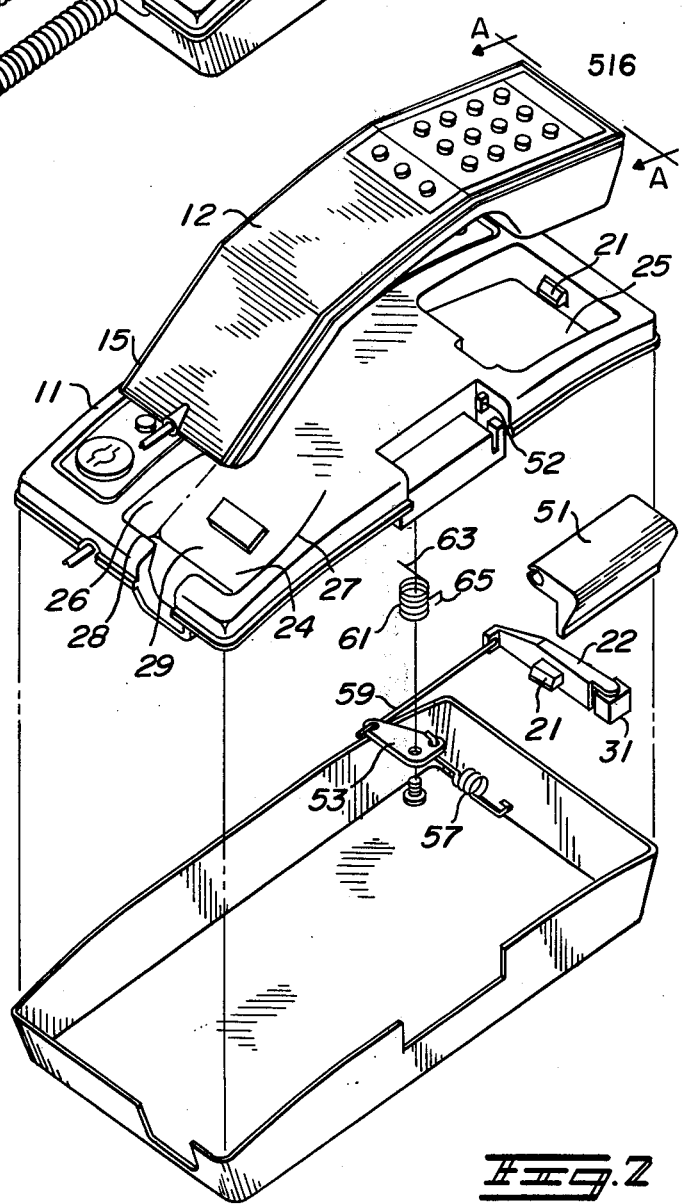
FIG. 2 shows an exploded view of the handset and base shown in FIG. 1.

The inventive apparatus of the present invention can be best illustrated with reference to a mobile telephone handset, a perspective view of which is shown in FIG. 1. The mobile telephone handset includes a base 11 and a handset 12 mounted on the base. Typically in a mobile environment the entire apparatus is mounted on a dashboard in a substantially vertical position and it is imperative that the handset 12 is firmly secured onto the base 11 so that the vibration caused by the moving motor vehicle will not throw the handset 12 off from the base 11. As illustrated in FIG. 2 in an exploded view, the handset 12 includes a bottom or heel portion 15 and a top or head portion 16. As illustrated, the head portion 16 includes a number of pushbuttons 20 for enabling the operator to dial a number he wishes to reach. The head portion 16 includes a recess 17 (FIG. 3) at the head end thereof. The recess 17 is shaped and positioned to receive a boss 21 of a locking arm 22 to apply a pressure against the handset toward the bottom or heel end of the handset 12.

Figure 3:
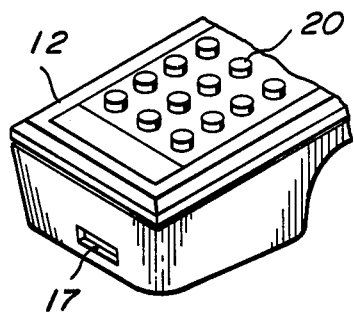
FIG. 3 shows the head end of the handset seen along A—A in FIG. 2.
Figure 4:
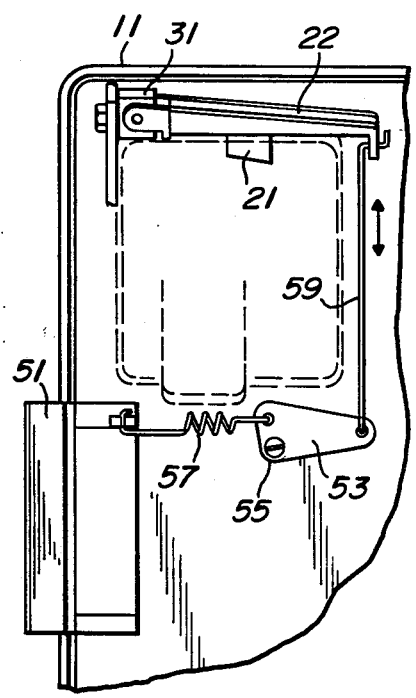
FIG. 4 shows a schematic diagram of the various operative elements illustrative of the operational relationship of the locking arm and spring loaded lever mechanisms.

The base 11 is provided with two recessed parts first recessed part 24 and the second recessed part 25. The recessed parts 24 and 25 are generally shaped to receive the heel 15 and head 16 end of the handset 12. Advantageously, the heel and head ends of the handset 12 are bent downwardly as illustrated and shaped so that the heel and head ends can be received into the first and second recessed parts. The first recessed part 24 is partly made up of the wall sides 26 and 27 and lip portions 28 and 29 curved upwardly toward the second depressed portion. The curved lips 28 and 29 and the side walls 26 and 27 of the first recessed part is shaped in a cup form to receive and retain the heel end of the handset. Because of the geometry of the recess and the lips, the operator holding the handset can insert the heel thereof into the first recess 24 and apply a force downwardly and at the same time, swing the head of the handset toward the second recess part 25. Because of the shape of the first recess, with the curved lips, 28 and 29, the handset is prevented from sliding downwardly as the operator applies force on the handset downwardly into the depressed portion. The lips and the side walls prevent the handset from sliding away and provide a pivotal portion to permit the swinging action of the handset. The surface shape of the boss 21 is such that as the operator pushes the head of the handset into the recess 25, the force exerted by the handset pushes the boss 24 and thereby the locking arm away and permits the head of the handset to enter into the recess 25. Just as the head of the handset comes to a rest position in the recess 25 the boss 21 slides into the recess 17 of the head of the handset. The boss 21 is held in the locked position where the boss is kept inserted into the recess 17 and is kept there by the locking arm 22 on a spring loaded lever mechanism as will be described in detail hereinbelow. The locking arm mechanism as illustrated in FIGS. 2, 3 and 4 includes the arm member 22 pivotally mounted on the base 11 at a pivot point 31 for movement into and away from the top end of the handset 12. The boss 21 is on the arm 22 at a position away from the pivot 31 and disposed to mate with the recess 17 when the arm is moved into a locked position as illustrated in FIG. 4.

The spring loaded lever mechanism includes a first lever 51 pivotally mounted about pivots 52 on the base 11 and a second lever 53 is pivotally mounted about the pivot 55 on the underside of the base member. The first and second lever are connected to each other by a linkage 57 so that the linkage 57 tends to move the second lever 53 counterclockwise as seen in FIG. 4. The mechanism further includes a second linkage 59 linking the second lever 53 to the end of the arm 22 as illustrated.

The second linkage 59 is linked at both ends thereof to the arm 22 and the second lever 53, respectively such that the rotational motion of the second lever 53 tends to cause translational motion as illustrated in FIG. 4 for moving the arm 22. This translational motion forces the boss 21 into and away from the recess 17. The mechanism is further provided with a spring member 61 for spring loading the entire lever mechanism. One end 63 of the spring is butted against a protruding portion of the underside of the base. The other end 65 of the spring is attached to the second lever 53. As many windings of the spring are wound around the pivot post of the lever 53 as necessary to store energy and urge the spring loaded mechanism in such a way that the locking arm 22 and the first lever 51 is held in a locking position by the spring force produced by the spring 61. The first linkage 57 may include a few coil windings to spring load and coact with the spring force of the spring 61.

Stated in other words, the spring 61 stores enough energy therein to provide clockwise force about the pivot 55 to apply a clockwise force to the locking arm 22 so that locking arm 22 is rotated about its pivot 31 toward the head of the handset to insert boss 21 into the recess 17. The clockwise force applied in this manner is balaced by a counterclockwise force exerted on the lever 53 by the linkage 57 connecting the second lever 53 to the first lever 51 and the spring 61.

Advantageously, the first lever pivotally connected to the base 11 is positioned on the side of the base and adjacent intermediate portion of the handset 12 such that an operator reaching for the handset 12 can in one continuing and sweeping motion conveniently press the lever and flip the lever counterclockwise with his fingertip upwardly and in a continuing motion release the locking arm 22 from the locked position to a release position as he grabs hold of the handset with his fingers. Referring to FIG. 4, it can be readily seen that as the lever 51 is forced downwardly (note that FIG. 4 shows a bottom view of the base) that is, counterclockwise, as illustrated, the second lever 53 is rotated counterclockwise by a counterclockwise force applied to the lever 53 via the linkage 57. This counterclockwise movement of the lever 53 causes the tip end of the arm 22 to move to unlocking position or counterclockwise about pivot 31. In this manner the boss 21 is moved out of the recess 17. This permits the operator to lift the head end of the handset 12 out of the second recessed part 25 of the base.

Once the fingers applying the counterclockwise force to the first lever 51 is removed, then the force transmitted to a second lever 53 via the linkage 57 is removed. This causes the lever 53 to rotate clockwise and this in turn causes the spring 61 return lever 53 to the normal locking position as illustrated in FIG. 4 by clockwise force applied to the lever 53 by the spring 61. This in turn causes translational movement of the locking arm 22 from up to down, or from the unlocking up position to the locking down position as illustrated by a bidirectional arrow in FIG. 4.

From the foregoing, it is evident that the recessed parts 24 and 25 in the base 11 and the spring loaded lever mechanism, the boss 21 and the locking arm 22 are adapted to permit a ready insertion by the operator of the handset into position in the base in a simple insertion motion. This is accomplished by providing the boss 21 which is slanted at its head in such a way that it permits the head end surface of the handset to slide over the head, push the boss away until it is snapped into position in the recess 17. The snap or reverse action of the boss is provided by the locking arm urged to stay in the locking position by the spring 61. In operation, the operator first inserts the heel end of the handset into the first recessed part 24 and swings the head into the second recessed part 25 in a swinging action using the first depressed part as a pivot. The tip end of the boss 21 is slanted in such a way that the head surface of the handset pushes the boss and thus the locking arm away from the locking position until the boss 21 is snapped into the recess 17 by the counterclockwise force of the spring 61 via the locking arm 22 under the control of the spring 61.

Briefly, it has been shown that an inventive apparatus according to the present invention, includes a handset, a base member and locking arm and spring loaded lever mechanism which permits an operator to hang up the handset into the base in one continuous movement of his fingers and thumbs as he grabs the handset and inserts the handset into recessed parts shaped to receive the handset. The recessed parts, the locking arm and the spring loaded lever mechanism are advantageously designed to permit ready positioning of the handset. Once the handset is positioned on the base by the operator, it is locked securely in position by the locking arm so that it stays in its locked position even when it is subjected to a violent vibration, as it is the case when such an apparatus is mounted to a mobile vehicle.

According to another advantageous aspect of the present invention, the spring loaded lever mechanism and the locking arm are designed to permit the operator of the apparatus to release the handset in one sweeping continuous motion, as he reaches for the handset with his hand, his fingertips can lift a lever of the lever mechanism momentarily to release the locking arm and thereby permit release of the handset from the base.

Various modifications and changes may be made by a person of ordinary skill without departing from the spirit and scope of the present invention.

What is claimed is:

1. A telephone apparatus comprising:

a handset with a heel and a head, the head having a recessed notch;

a base having a first part with a protruding curled lip shaped to receive and hold the heel of the handset and a second part adapted to receive the head of the handset when said handset is placed on said base;

a locking arm with a boss, the arm being pivotally mounted on said base and the boss being located on said arm at a distance from the pivot to mate with the recessed notch in the head of the handset;

a spring loaded mechanism for keeping said locking arm in a locked position whereby its boss is kept mated in the recessed notch in the head of the handset, said mechanism adapted to be operable to move the locking arm and thereby the boss away from the recessed notch to a released position to release the handset in response to an external pressure applied thereto.

2. The apparatus according to claim 1, wherein the base has a second part including a recess to receive the head of said handset and wherein the first part of said base is made of a recess in the base with the lip curled upwardly to conform to the shape of the heel of the handset to receive the heel into the recess in the first part and to provide a pivoting surface to the heel of the handset to permit the head of said handset to swing into the recess in the second part of said base.

3. The apparatus according to claim 2, wherein said spring-loaded mechanism includes first and second levers pivotally mounted on said base respectively;

a linkage connecting said second lever to said locking arm;

a first spring linking said first lever to said second lever for urging said locking arm away from locking position toward a release position thereby urging to move the boss away from the recess of the handset, a second spring coupled to the pivot of said second lever to counteract said first spring for urging said locking arm into a locking position thereby urging to move the boss into the recess of the handset and retain therein;

said first lever being positioned on said base adjacent intermediate portion of said handset so that an operator reaching out to grab the handset with his hand can press said first lever with his fingers in one continuous motion whereby the force of the pressure applied to said first lever is transmitted through said first spring, said second lever and thence to move said locking arm to the release position and thereby release the boss and unlock said handset from said base.

4. The apparatus according to claim 3, wherein the boss of said locking arm is slanted such that the head of said handset pushes the boss away and out as the head of said handset is inserted into the recess in the second part of the base until the boss is snapped into the recessed notch of said handset by the spring action of said second spring.

* * * * *